(12) United States Patent
Inoue et al.

(10) Patent No.: US 8,440,975 B2
(45) Date of Patent: May 14, 2013

(54) SCINTILLATOR, RADIATION DETECTING APPARATUS, AND RADIATION IMAGING APPARATUS

(75) Inventors: Masato Inoue, Kumagaya (JP); Masayoshi Akiyama, Yokohama (JP); Shinichi Takeda, Honjo (JP); Satoru Sawada, Kodama-gun (JP); Takamasa Ishii, Honjo (JP); Taiki Takei, Okegawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 13/277,353

(22) Filed: Oct. 20, 2011

(65) Prior Publication Data

US 2012/0119094 A1 May 17, 2012

(30) Foreign Application Priority Data

Nov. 16, 2010  (JP) ................................ 2010-256320

(51) Int. Cl.
*G01F 23/00* (2006.01)
(52) U.S. Cl.
USPC .................................................. 250/363.01
(58) Field of Classification Search .................. 250/362, 250/363.01–363.1
See application file for complete search history.

(56) References Cited

U.S. PATENT DOCUMENTS

| | | | | |
|---|---|---|---|---|
| 4,292,538 | A | * | 9/1981 | Carlson ........................ 250/367 |
| 4,438,334 | A | * | 3/1984 | Jatteau et al. ............. 250/363.02 |
| 7,256,404 | B2 | | 8/2007 | Inoue et al. ................ 250/370.11 |
| 7,514,686 | B2 | | 4/2009 | Ogawa et al. ............. 250/361 R |
| 7,692,152 | B2 | | 4/2010 | Inoue ......................... 250/361 R |
| 7,714,294 | B2 | | 5/2010 | Sawada et al. ............ 250/370.11 |
| 7,952,058 | B2 | | 5/2011 | Nomura et al. ............. 250/208.1 |
| 2009/0283685 | A1 | | 11/2009 | Takeda et al. ............. 250/370.11 |
| 2010/0102236 | A1 | | 4/2010 | Inoue et al. ............... 250/361 R |
| 2011/0315886 | A1 | | 12/2011 | Sawada et al. ................ 250/366 |

FOREIGN PATENT DOCUMENTS

JP   2005-214800   8/2004

* cited by examiner

*Primary Examiner* — Kiho Kim
(74) *Attorney, Agent, or Firm* — Fitzpatrick, Cella, Harper & Scinto

(57) ABSTRACT

A scintillator includes a scintillator layer which converts radiation into light, the scintillator layer having a first end forming part of a contour of the scintillator layer and a second end forming another part of the contour, wherein the first end and the second end are located on opposite sides of the scintillator layer when viewed from the center of the scintillator layer, wherein an efficiency of conversion from radiation into light decreases from the first end to the second end.

8 Claims, 8 Drawing Sheets

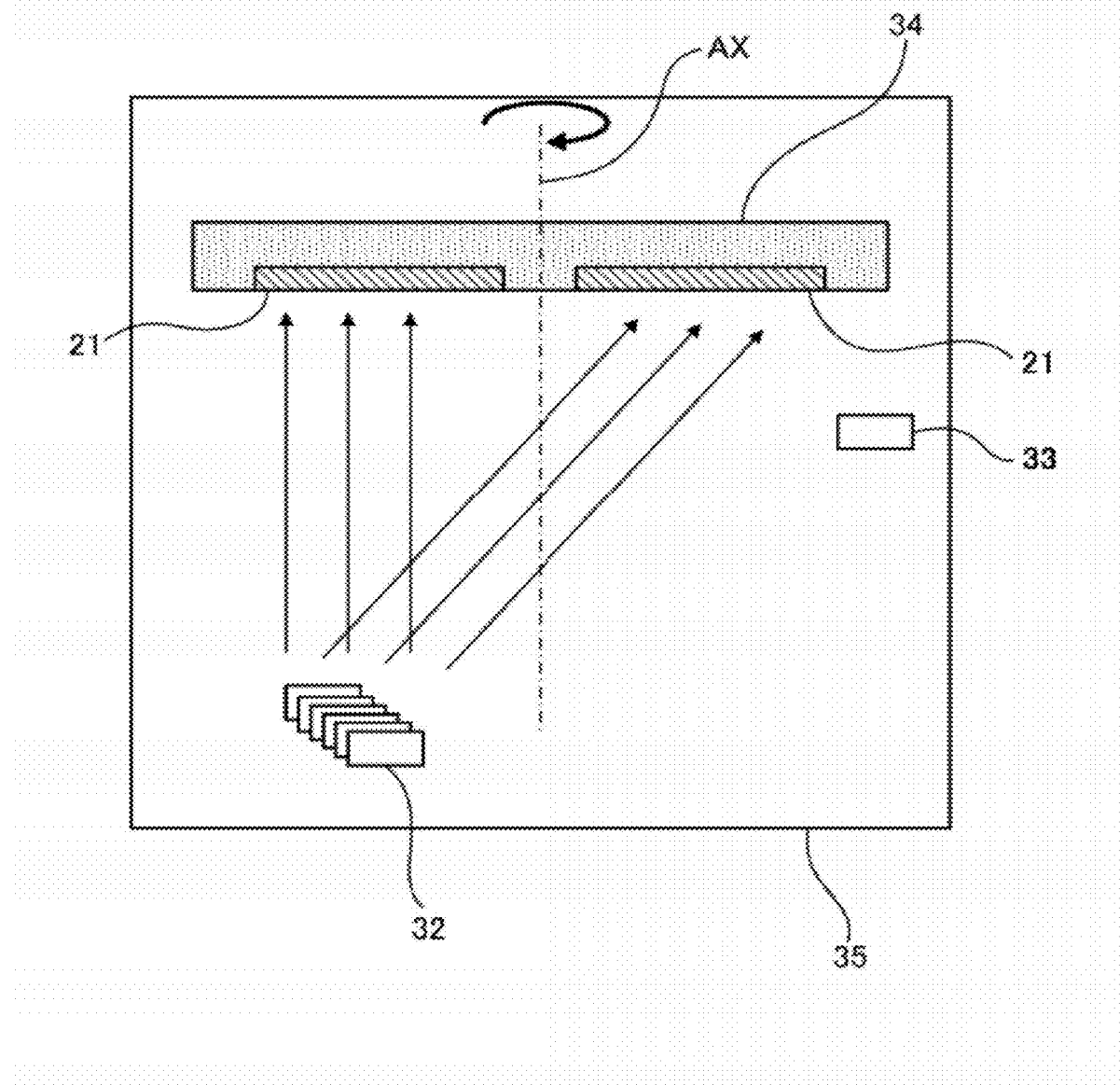

SCINTILLATOR, RADIATION DETECTING APPARATUS, AND RADIATION IMAGING APPARATUS

BACKGROUND OF THE INVENTION

1. Field of the Invention

The present invention relates to a scintillator, a radiation detecting apparatus, and a radiation imaging apparatus.

2. Description of the Related Art

Japanese Patent Laid-Open No. 2005-214800 relates to mammography which radiographs a breast while sandwiching it. This literature discloses a radiation image sensor including a photosensitive unit having a plurality of photodiodes arranged two-dimensionally and a scintillator layer placed on the photosensitive unit. The scintillator layer has a columnar crystal structure of cesium iodide (CsI) doped with thallium (Tl).

Mammography uses low-energy X-rays exhibiting a large absorption difference between tissues to identify a focus in a breast which is a soft tissue. Combining a molybdenum X-ray tube with a molybdenum filter can generate X-rays similar to monochromatic X-rays including characteristic X-rays. Using such X-rays can obtain an image with high contrast.

In mammography, a breast is placed on a radiographic imaging table incorporating a radiation image sensor and irradiated with X-rays from above while being compressed downward by a compression plate. X-rays are absorbed by the breast, but are not absorbed by any portion other than the breast and strike the scintillator. The X-rays which have struck the scintillator are converted into light by the scintillator. A photodetector placed below the scintillator then photoelectrically converts the light. The output from the photodetector is low in level in the breast region and high in regions other than the breast. This causes halation. The halation influences an image of the breast region in which the output level is low, resulting in white blur and deterioration in contrast. This may lead to inability to perform accurate diagnostic imaging.

SUMMARY OF THE INVENTION

The present invention provides a technique effective in improving image quality in mammography.

The first aspect of the present invention provides a scintillator including a scintillator layer which converts radiation into light, the scintillator layer having a first end forming part of a contour of the scintillator layer and a second end forming another part of the contour, wherein the first end and the second end are located on opposite sides of the scintillator layer when viewed from the center of the scintillator layer, wherein an efficiency of conversion from radiation into light decreases from the first end to the second end.

The second aspect of the present invention provides a radiation detecting apparatus comprising a scintillator defined as the first aspect of the present invention, and a sensor panel including a photoelectric converter array which detects light generated by the scintillator layer of the scintillator when radiation strikes the scintillator.

The third aspect of the present invention provides a radiation imaging apparatus comprising a radiation detecting apparatus defined as the second aspect of the present invention; and a radiation source.

Further features of the present invention will become apparent from the following description of exemplary embodiments with reference to the attached drawings.

BRIEF DESCRIPTION OF THE DRAWINGS

FIG. 8 is a view schematically showing the arrangement of a preferred deposition apparatus for the formation of a scintillator layer in the radiation detecting apparatus according to the second embodiment of the present invention;

DESCRIPTION OF THE EMBODIMENTS

Figure 1:
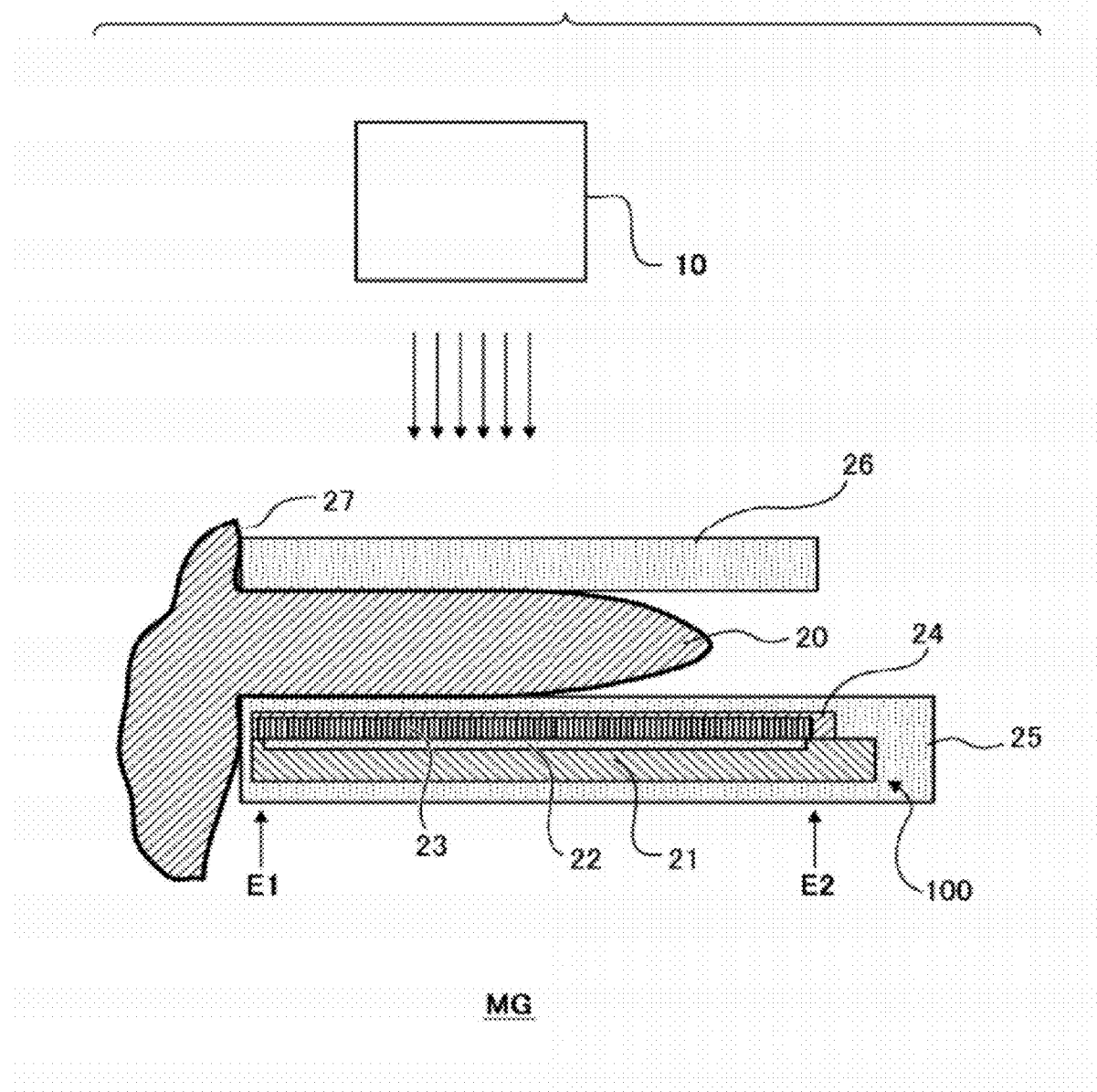
FIG. 1 is a view showing the basic arrangement of a radiation imaging apparatus according to a preferred embodiment of the present invention.

The basic arrangement of a radiation imaging apparatus MG and a method of imaging a breast 20 by using the radiation imaging apparatus MG according to a preferred embodiment of the present invention will be described with reference to FIG. 1. The radiation imaging apparatus MG includes a radiographic imaging table (body) 25, a compression plate 26, and a radiation source 10. The breast 20 of a subject 27 is placed on the radiographic imaging table 25 and is compressed downward by the compression plate 26. The radiation source 10 then irradiates the breast 20 with radiation (X-rays) through the compression plate 26. The radiation transmitted through the breast 20 strikes the radiographic imaging table 25. The radiographic imaging table 25 incorporates a radiation detecting apparatus 100. The radiation detecting apparatus 100 includes a scintillator layer 23 which converts radiation into light and a photoelectric converter array 22 which detects light converted by the scintillator layer 23.

Figure 10:
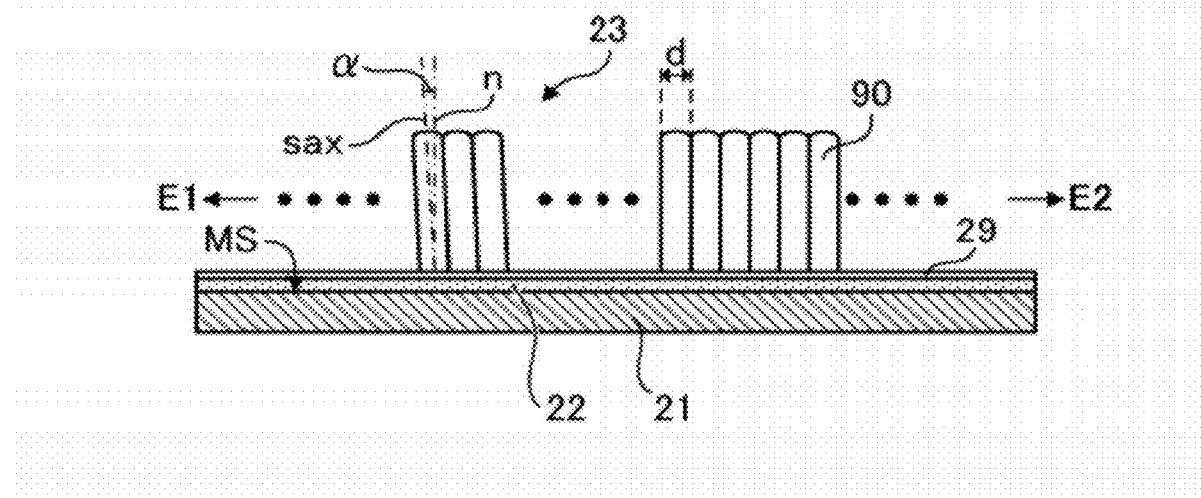
FIG. 10 is a view schematically showing the arrangement of a scintillator layer.

The photoelectric converter array 22 can be formed, for example, on a substrate 21 such as a glass substrate. As schematically shown in FIG. 10, the scintillator layer 23 can be formed on an insulating layer 29 on the photoelectric converter array 22. A protective layer 24 can cover the scintillator layer 23. The scintillator layer 23 can have a columnar crystal structure made of an aggregate of many columnar crystals 90. The scintillator layer 23 can be formed by simultaneously evaporating cesium iodide (CsI) as a major agent and thallium iodide (TlI) containing an activating agent. The scintillator layer 23 includes a first end E1 forming part of the contour of the scintillator layer 23 and a second end E2 forming another part of the contour of the scintillator layer 23.

Note that the contour of the scintillator layer 23 indicates the contour of the largest one (a surface parallel to a principal surface MS of the substrate 21) of the surfaces of the scintillator layer 23. The first end E1 and the second end E2 are located on the opposite sides when viewed from the center of the scintillator layer 23. The first end E1 is an end on the subject 27 side.

The efficiency of conversion from radiation into light decreases from the first end E1 to the second end E2. The efficiency of conversion from radiation into light being high indicates that the scintillator layer 23 generates light having large energy when radiation having predetermined energy strikes the scintillator layer 23. The efficiency of conversion from radiation into light being low indicates that the scintillator layer 23 generates light having small energy when radiation having predetermined energy strikes the scintillator layer 23. The arrangement configured to decrease the efficiency of conversion from radiation into light from the first end E1 to the second end E2 can suppress the generation of halation due to radiation striking the radiation detecting apparatus 100 without being transmitted through the breast. This makes it possible to obtain an image with high contrast. The arrangement configured to decrease the efficiency of conversion from radiation into light from the first end E1 to the second end E2 can be, for example, an arrangement in which the efficiency has a gradual change. Alternatively, the arrangement configured to decrease the efficiency of conversion from radiation into light from the first end E1 to the second end E2 can be an arrangement in which when the region between the first end E1 and the second end E2 is segmented into a plurality of regions, for example, about five to 10, the respective regions differ in average efficiency.

Figure 2:
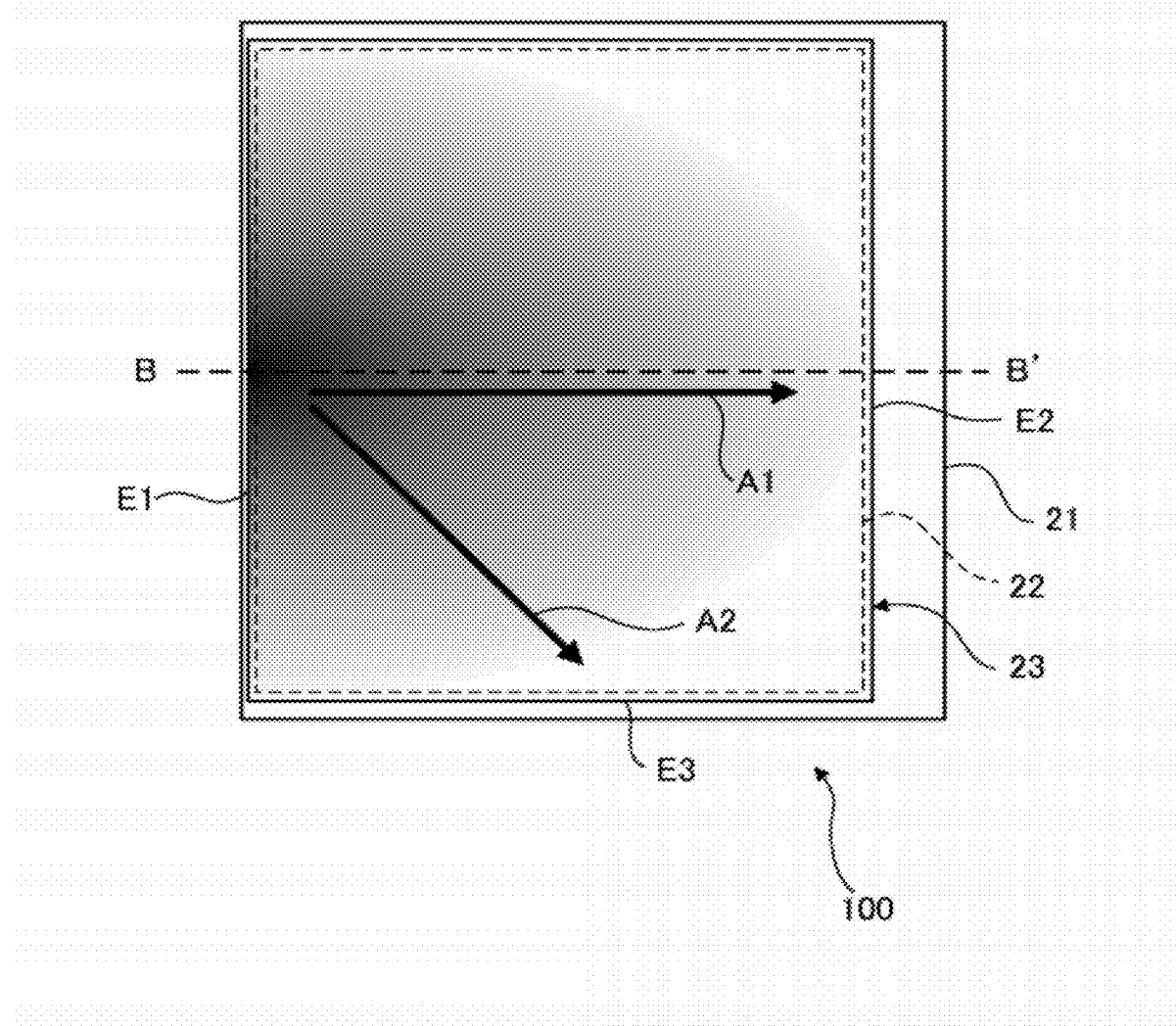
FIG. 2 is a view showing the arrangement of a radiation detecting apparatus according to the first embodiment of the present invention.
Figure 3:
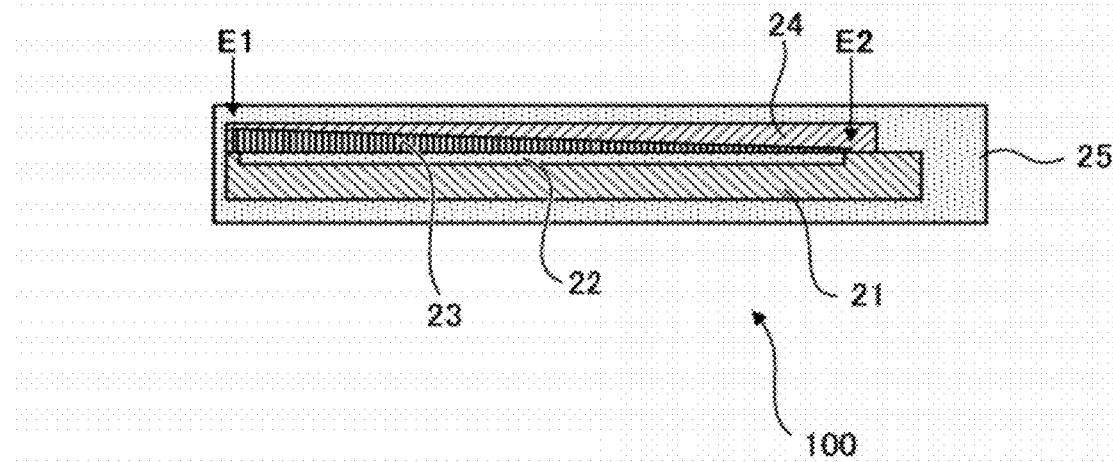
FIG. 3 is a view showing the arrangement of the radiation detecting apparatus according to the first embodiment of the present invention.

The arrangement of the radiation detecting apparatus 100 according to the first embodiment of the present invention will be described with reference to FIGS. 2 and 3. Dark colors in the gradation added to the scintillator layer 23 of the radiation detecting apparatus 100 shown in FIG. 2 indicate large thicknesses, whereas light colors indicate small thicknesses. FIG. 3 is a sectional view taken along a line B-B' of the radiation detecting apparatus 100 shown in FIG. 2. The scintillator layer 23 can be formed by, for example, simultaneously evaporating cesium iodide (CsI) as a major agent and thallium iodide (TlI) containing an activating agent. In the first embodiment, the thickness of the scintillator layer 23 decreases from the first end E1 to the second end E2 (in the direction indicated by an arrow A1) to implement an arrangement in which the efficiency of conversion from radiation into light decreases from the first end E1 to the second end E2. The thickness of the scintillator layer 23 may continuously decrease from the first end E1 to the second end E2, as schematically shown in FIGS. 2 and 3. Alternatively, although not shown in FIGS. 2 and 3, the thickness of the scintillator layer 23 may decrease step by step from the first end E1 to the second end E2. As a method of changing the thickness of the scintillator layer 23 step by step, for example, there is available a method of making a shield plate shield a region in which the scintillator layer 23 is to be formed during part of the period of formation processing of the scintillator layer 23.

The scintillator layer 23 can further include a third end E3 forming part of the contour of the scintillator layer 23 which connects the first end E1 to the second end E2 of the contour of the scintillator layer 23. The efficiency of conversion from radiation into light preferably decreases from the first end E1 to the third end E3 (in the direction indicated by an arrow A2).

Figure 4:
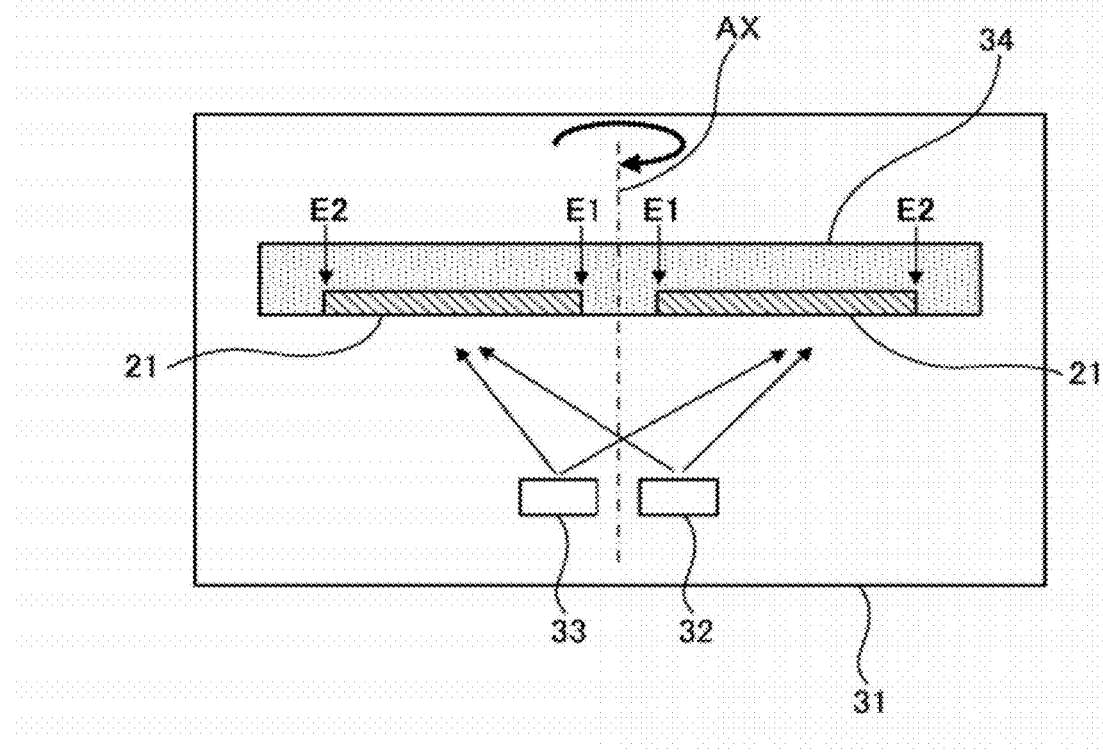
FIG. 4 is a view schematically showing the arrangement of a preferred deposition apparatus for forming a scintillator layer in the radiation detecting apparatus according to the first embodiment of the present invention.
Figure 5:
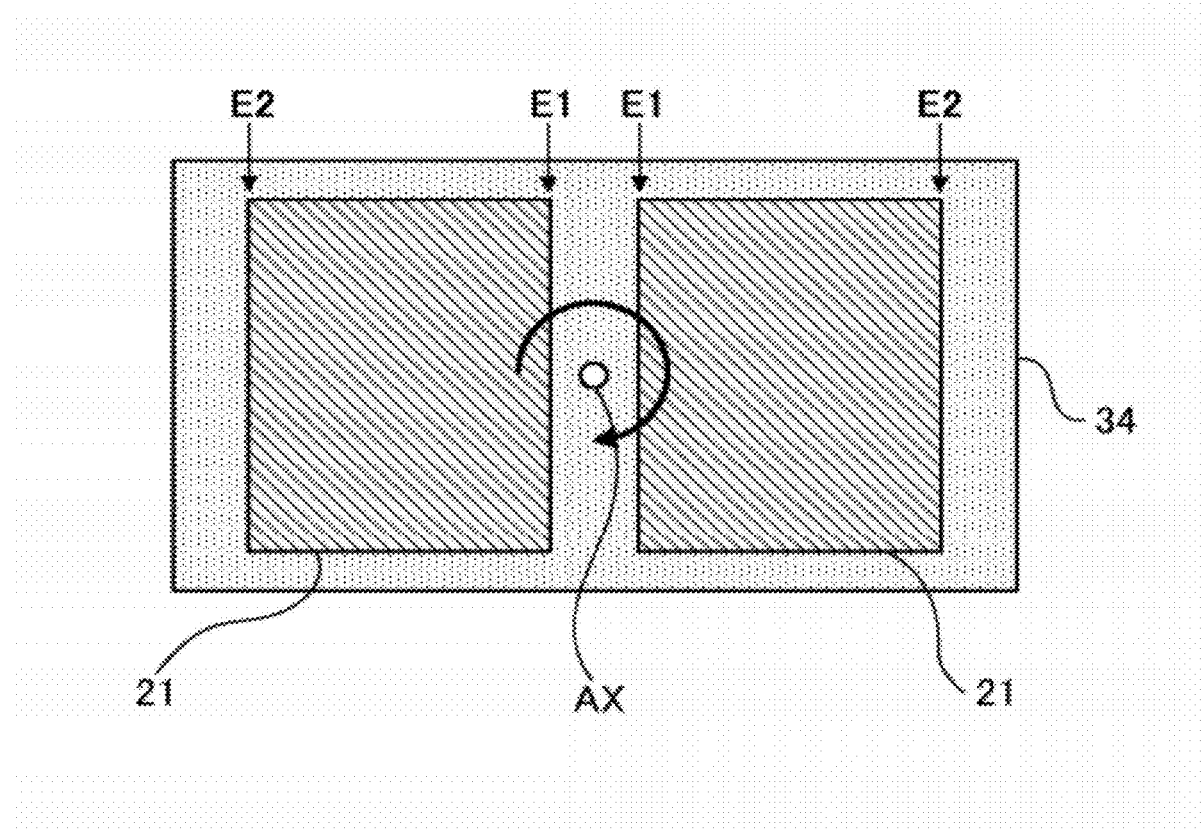
FIG. 5 is a view schematically showing the arrangement of a preferred deposition apparatus for the formation of a scintillator layer in the radiation detecting apparatus according to the first embodiment of the present invention.

FIG. 4 schematically shows the arrangement of a preferred deposition apparatus 31 for the formation of the scintillator layer 23 of the radiation detecting apparatus 100 according to the first embodiment of the present invention. The deposition apparatus 31 can include a boat 32 which supports cesium iodide (CsI) as a major agent, a boat 33 which supports thallium iodide (TlI) containing an activating agent, and a holding portion 34 which holds one or a plurality of substrates 21 on which the photoelectric converter array 22 is formed. FIG. 5 schematically shows the substrates 21 held by the holding portion 34. The holding portion 34 rotates around a rotation axis AX while holding the substrates 21. The holding portion 34 holds each substrate 21 such that a position where the first end E1 is to be formed becomes near the rotation axis AX, and a position where the second end E2 is to be formed becomes far from the rotation axis AX. As the holding portion 34 rotates, the substrates 21 rotate. The boats 32 and 33 can be placed near the rotation axis AX. Heating the boats 32 and 33 while rotating the substrates 21 will evaporate cesium iodide (CsI) and thallium iodide (TlI) and scatter the evaporated particles. They are then deposited on each substrate 21 to form the scintillator layer 23. This forms the scintillator layer 23 whose thickness continuously decreases from the first end E1 to the second end E2. In addition, the thickness of the scintillator layer 23 can continuously decrease from the first end E1 to the third end E3.

A diameter d of each columnar crystal of the columnar crystal structure of the scintillator layer 23 formed by the deposition apparatus 31 can decrease from the first end E1 to the second end E2. The density of columnar crystals per unit area can be said to decrease from the first end E1 to the second end E2. This arrangement can be implemented by lowering the temperature at the time of deposition from the first end E1 to the second end E2. This arrangement contributes to the characteristic that the efficiency of conversion from radiation into light decreases from the first end E1 to the second end E2.

An angle α (see FIG. 10) defined by an axial direction sax of each columnar crystal of the columnar crystal structure of the scintillator layer 23 formed by the deposition apparatus 31 and a normal line n to the principal surface MS of the substrate 21 can increase from the second end E2 to the first end E1. This is because the angle defined by the growth direction of each columnar crystal (that is, the axial direction sax of each columnar crystal) and the normal line n to the principal surface MS of the substrate 21 increases from the second end E2 to the first end E1. This arrangement is effective when radiation emerges from the cathode of a radiation source and spatially spreads. This angle contributes to good resolution characteristics because the direction of radiation emerging from the radiation source 10 becomes almost parallel to the axial direction of each columnar crystal of the scintillator layer 23, and the probability that radiation which has struck a given portion will strike other columnar crystals becomes low.

Figure 6:
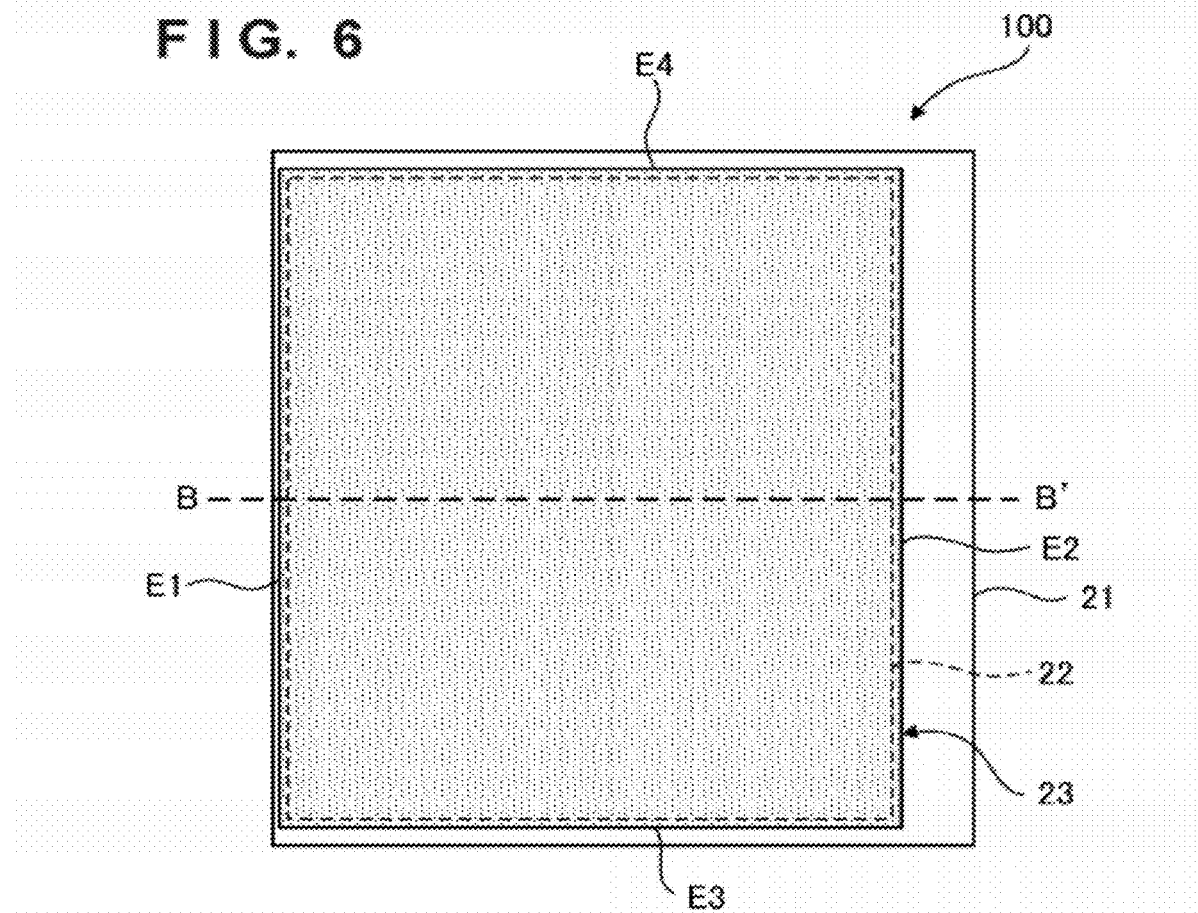
FIG. 6 is a view showing the arrangement of a radiation detecting apparatus according to the second embodiment of the present invention.
Figure 7:
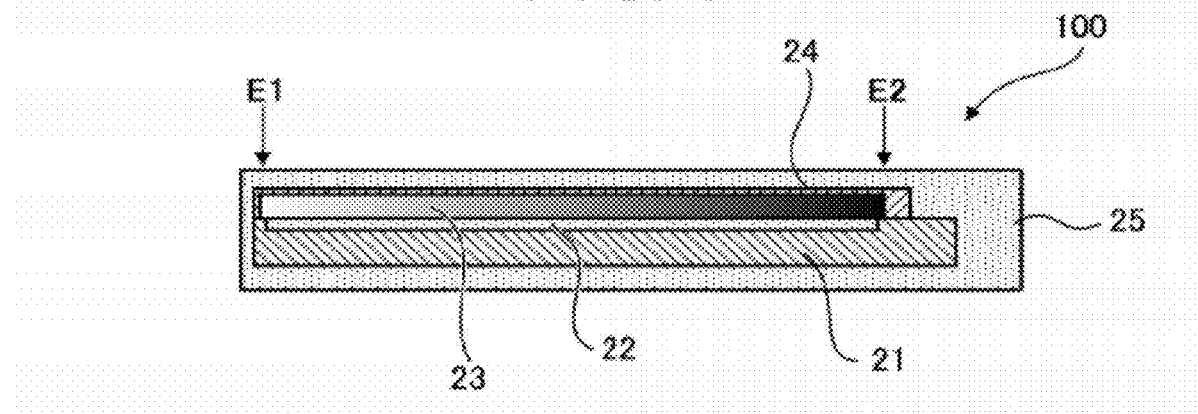
FIG. 7 is a view showing the arrangement of a radiation detecting apparatus according to the second embodiment of the present invention.

The arrangement of a radiation detecting apparatus 100 according to the second embodiment of the present invention will be described with reference to FIGS. 6 and 7. FIG. 7 is a sectional view taken along a line B-B' of the radiation detecting apparatus 100 shown in FIG. 6. In this case, dark colors in the gradation added to a scintillator layer 23 in the radiation detecting apparatus 100 shown in FIG. 7 indicate that the ratios of an activating agent (thallium) to cesium iodide doped with the activating agent (thallium) are high, whereas light colors indicate that the ratios are low. The gradation added to the scintillator layer 23 can be said to indicate the magnitude relationship between the concentrations of an activating agent in the scintillator layer. The second embodiment is configured to increase the ratio of an activating agent (thallium) to cesium iodide doped with the activating agent from the first end E1 to the second end E2 (in the direction indicated by an arrow A1). The range of the ratios of an activating agent is the range in which as the ratio increases, the efficiency of conversion from radiation into light decreases. For example, in the range of the concentrations of an activating agent from 1.5 mol % or more to 3.0 mol % or less, the higher the concentration of the activating agent, the lower the efficiency of conversion from radiation into light. This implements an arrangement in which the efficiency of conversion from radiation into light decreases from a first end E1 to a second end E2. The ratio of an activating agent (thallium) to cesium iodide doped with the activating agent can continuously increase from the first end E1 to the second end E2, as schematically shown in FIG. 7. Although not shown, the ratio of an activating agent (thallium) to cesium iodide doped with the activating agent can increase step by step from the first end E1 to the second end E2. As a method of changing the ratio of an activating agent to a major agent step by step, for example, there is available a method of making a shield plate shield a region in which a scintillator layer 23 is to be formed during part of the period of formation processing of the scintillator layer 23.

In this case, after cesium iodide (CsI) and thallium iodide (TlI) containing an activating agent are deposited on a substrate 21 on which a photoelectric converter array 22 is formed, the resultant structure can be annealed. In this annealing, forming a temperature distribution in which the temperature decreases from the first end E1 to the second end E2 is advantageous in the formation of an arrangement in which the efficiency of conversion from radiation into light decreases from the first end E1 to the second end E2.

The efficiency of conversion from radiation into light preferably decreases from the first end E1 to a third end E3 (in the direction indicated by an arrow A2). This arrangement is implemented by increasing the ratio of an activating agent to a major agent from the first end E1 to the third end E3 (in the direction indicated by the arrow A2).

FIG. 8 schematically shows the arrangement of a preferred deposition apparatus 35 for the formation of the scintillator layer 23 of the radiation detecting apparatus 100 according to the second embodiment. The deposition apparatus 35 can include a plurality of boats 32 which support cesium iodide (CsI) doped with an activating agent (thallium), a boat 33 which supports thallium iodide (TlI) containing an activating agent, a holding portion 34 which holds one or a plurality of substrates 21 on which the photoelectric converter array 22 is formed. FIG. 5 schematically shows the substrates 21 held by the holding portion 34. In this case, the plurality of boats 32 can be arranged such that cesium iodide (CsI) as a major agent which is heated and evaporated by the boats is deposited on the substrates 21 with a uniform thickness. The boat 33 can be placed to form the scintillator layer 23 which makes the ratio of the activating agent to the scintillator layer increase from the first end E1 to the second end E2. The boat 33 can be placed away from a rotation axis AX, and preferably be located outside the rotating substrates 21.

This embodiment has exemplified the scintillator layer 23 in which the ratio of the activating agent to the scintillator layer increases from the first end E1 to the second end E2. However, it is possible to form the scintillator layer 23 in which this ratio decreases from the first end E1 to the second end E2. In this case, the concentration of the activating agent preferably falls within the range of lower than 1.5 mol %. In this range, the lower the concentration of the activating agent, the lower the efficiency of conversion from radiation into light.

Figure 9A:
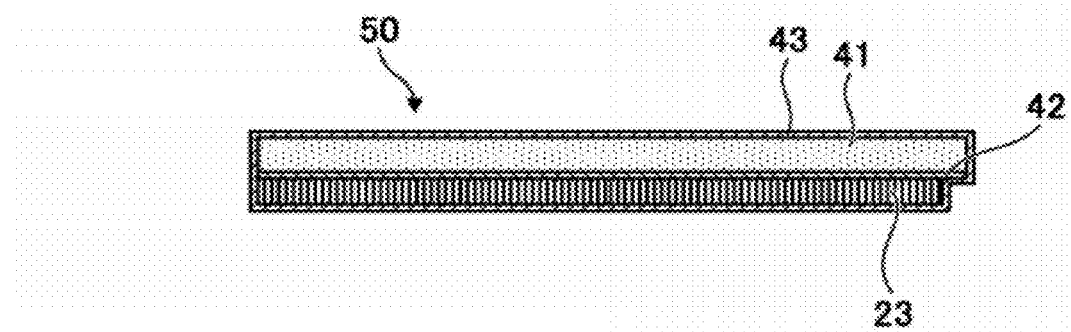
FIGS. 9A to 9C are views showing the arrangement of a radiation detecting apparatus according to the third embodiment of the present invention.
Figure 9B:
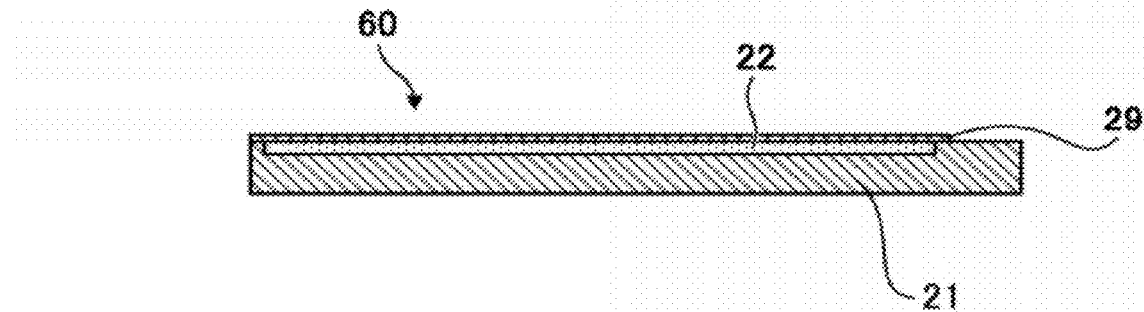
Figure 9C:
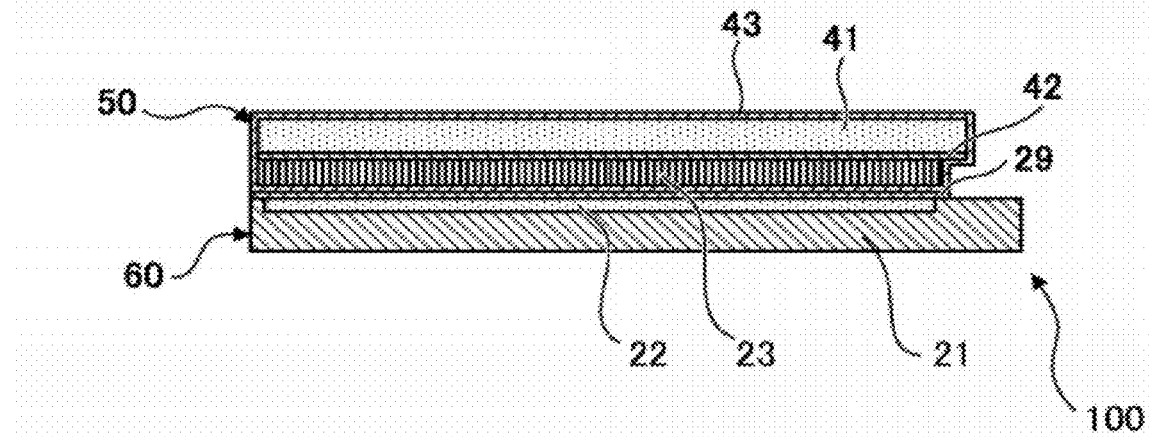

In the first and second embodiments, the scintillator layer 23 is grown on an insulating layer on the photoelectric converter array 22 formed on the substrate 21. However, the present invention is not limited to this, and it is possible to join the scintillator including the scintillator layer 23 to the sensor panel including the photoelectric converter array 22 after they are separately manufactured. The radiation detecting apparatus 100 can also be manufactured by separately manufacturing the scintillator (or also called a scintillator panel) 50 exemplarily shown in FIG. 9A and a sensor panel 60 exemplarily shown in FIG. 9B and then joining the scintillator 50 to the sensor panel. FIG. 9C exemplarily shows the radiation detecting apparatus 100 manufactured by joining the scintillator 50 to the sensor panel 60.

The scintillator 50 can include, for example, the scintillator layer 23, a substrate 41 which supports the scintillator layer 23, and a protective layer 43 which covers at least the scintillator layer 23. The scintillator 50 can also include a reflecting layer 42 which reflects light. The arrangement of the scintillator layer 23 can comply with the arrangement of the present invention, for example, the arrangement of the first embodiment or the second embodiment. The reflecting layer 42 is placed between, for example, the substrate 41 and the scintillator layer 23 to prevent light from striking the scintillator layer 23. The sensor panel 60 can include, for example, the substrate 21, the photoelectric converter array 22 formed on the substrate 21, and an insulating layer 29 which covers the photoelectric converter array 22.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-256320, filed Nov. 16, 2010, which is hereby incorporated by reference herein in its entirety.

What is claimed is:

1. A scintillator including a scintillator layer which converts radiation into light, the scintillator layer having a first end forming part of a contour of the scintillator layer and a second end forming another part of the contour, wherein the first end and the second end are located on opposite sides of the scintillator layer when viewed from the center of the scintillator layer,
wherein an efficiency of conversion from radiation into light decreases from the first end to the second end.

2. The scintillator according to claim 1, wherein a thickness of the scintillator layer decreases from the first end to the second end.

3. The scintillator according to claim 1, wherein the scintillator layer includes a major agent and an activating agent, and a ratio of the activating agent to the major agent increases from the first end to the second end.

4. The scintillator according to claim 1, wherein the scintillator layer is formed on a principal surface of a substrate, and includes a columnar crystal structure, and an angle defined by an axial direction of a columnar crystal of the columnar crystal structure and a normal line to the principal surface of the substrate increases from the first end to the second end.

5. The scintillator according to claim 1, wherein the scintillator layer includes a columnar crystal structure, and a diameter of a columnar crystal of the columnar crystal structure decreases from the first end to the second end.

6. The scintillator according to claim 1, wherein the scintillator layer further includes a third end forming a portion which connects the first end and the second end of the contour of the scintillator layer, and
- an efficiency of conversion from radiation into light decreases from the first end to the third end.

7. A radiation detecting apparatus comprising:
- a scintillator defined in claim 1; and
- a sensor panel including a photoelectric converter array which detects light generated by the scintillator layer of the scintillator when radiation strikes the scintillator.

8. A radiation imaging apparatus comprising:
- a radiation detecting apparatus defined in claim 7; and
- a radiation source.

* * * * *